United States Patent [19]

Cosper

[11] 4,135,969

[45] Jan. 23, 1979

[54] GLYCIDALDEHYDE MODIFIED CATIONIC POLYACRYLAMIDE POLYMERS USED IN PAPER

[75] Inventor: David R. Cosper, Downers Grove, Ill.

[73] Assignee: Nalco Chemical Company, Chicago, Ill.

[21] Appl. No.: 445,220

[22] Filed: Feb. 25, 1974

[51] Int. Cl.² ............................................. D21H 3/48
[52] U.S. Cl. .......................... 162/167; 162/168 NA; 526/55
[58] Field of Search ............... 162/164, 166, 167, 168; 260/72 R, 72 N, 348 R; 8/116.4, 181, 194

[56] References Cited

U.S. PATENT DOCUMENTS

| | | | |
|---|---|---|---|
| 3,013,024 | 12/1961 | Payne | 260/348 R |
| 3,215,488 | 11/1965 | Suiter | 8/116.4 |
| 3,329,657 | 7/1967 | Strazdins et al. | 260/72 N |
| 3,507,847 | 4/1970 | Williams et al. | 162/168 |
| 3,842,054 | 10/1974 | Keim | 162/168 |

*Primary Examiner*—S. Leon Bashore
*Assistant Examiner*—William F. Smith
*Attorney, Agent, or Firm*—Kinzer, Plyer, Dorn & McEachran

[57] ABSTRACT

A product and method of preparation useful for treatment of paper which provides paper with increased wet and dry strength.

2 Claims, No Drawings

GLYCIDALDEHYDE MODIFIED CATIONIC POLYACRYLAMIDE POLYMERS USED IN PAPER

BACKGROUND OF THE INVENTION

This invention relates generally to paper treating chemicals and more particularly concerns cationic polymers modified with glycidaldehyde. The invention relates to a novel and useful paper treating compound and a method of producing such compound. An object of the invention is to improve the wet and dry strength of paper.

SUMMARY OF THE INVENTION

Polyacrylamide is first rendered cationic, or a cationic polyacrylamide copolymer is prepared and such cationic polyacrylamide is then modified by contacting it with glycidaldehyde. The modification is quenched and the resulting product is introduced to a paper pulp. The resulting paper thus prepared has increased wet and dry strengths.

Other and further objects of the present invention will be apparent from the following description, claims and examples which by way of illustration show a preferred embodiment of the present invention and principle thereof and what is now considered to be the best mode contemplated in applying that principle. Other embodiments of the invention embodying the same or equivalent principles may be used and obvious changes may be made as desired by those skilled in the art without departing from the present invention.

DETAILED DESCRIPTION OF THE INVENTION

The initial polymer can either be a polyacrylamide which is modified to obtain a cationic polyacrylamide, such as by a Mannich reaction, or it can be a copolymer of acrylamide and another monomer which will provide a tertiary ammonium group. Other polymers can be used as long as they contain both a cationic group, such as a tertiary ammonium function, and an amide group.

The initial polymers and glycidaldehyde are reacted in aqueous solution at a total solids loading of less than 20%. The preferred initial polymers have molecular weights in the range of 20,000 to 100,000. Their solutions are low in viscosity but the reaction with glycidaldehyde increases the viscosity markedly. The reaction must be quenched or the reaction mixture would gell quickly.

The modification reaction between polymer and glycidaldehyde is complex. The two most probable processes involve: (1) reaction of tertiary amine with an epoxy reactive site; and, (2) reaction of an amide reactive site with an aldehyde. These two reactions, set forth below, account for the cross-linking of polymer chains that is evident. Unreacted aldehyde in the finished polymer makes it reactive to cellulose.

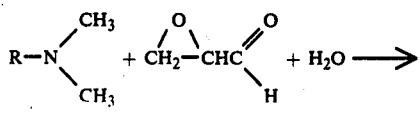
1.

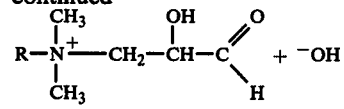

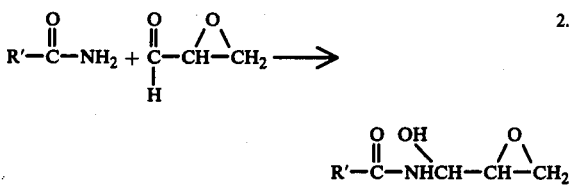
2.

The pH of the reaction mixture increases during the reaction.

Activity as a wet-strength additive is clearly favored by high pH during the glycidaldehyde modification step. High activity also results from excess glycidaldehyde, more moles of glycidaldehyde than of the cationic portion of the polymer. Acidification and dilution during quenching serve to lengthen the shelf-life. Without the step of quenching, gelation would occur within minutes.

The following examples set forth a preferred embodiment of the invention; however, it is not intended that they in any way limit the scope of the invention as defined by the appended claims.

EXAMPLE 1

A Typical Preparation of an Initial Polymer Using a Mannich reaction. (78A)

Polymerization of acrylamide was carried out in a 1.5 1. resin kettle equipped with mechanical stirrer, immersion thermometer, addition funnel and distillation condenser. Into the flask was placed a homogeneous solution of 100 g of acrylamide, 70 ml. of de-ionized water and 199 ml of isopropanol. A solution of 0.80 g of potassium persulfate in 40 ml of de-ionized water was placed in the addition funnel. The kettle was heated rapidly, via a heating mantel, to 70° C. (about 25 minutes). The $K_2S_2O_8$ solution was then added. The temperature was allowed to rise gradually, about 100 minutes, to 97° C. while distilling off isopropanol. At this point the heating mantel was removed and the solution allowed to cool. Sufficient de-ionized water was added to get a 10% polyacrylamide solution.

To 400 g of the above polyacrylamide solution was added 25.4 g of 25% aqueous dimethylamine and 11.4 g of 37% aqueous formaldehyde. The mixture was heated at 45°–50° C. for 60 minutes and allowed to cool. The resulting cationic polymer had a theoretical degree of substitution of 25 mole % of cationic groups.

EXAMPLE 2

Glycidaldehyde Modification of the Initial Polymer

Forty (40.0) g of an initial polymer as prepared in Example 1 was placed in a 100 ml beaker equipped with a magnetic stirring bar. Glycidaldehyde (1.63 ml) was added with good mixing and the pH adjusted to 9.0 with a few drops of 20% (weight/volume) aqueous NaOH. After 5 minutes of mixing the pH had increased to 9.4. The viscosity of the reaction mixture increased markedly until at 10.8 minutes further mixing was impossible. The reaction was quenched with a mixture of 40 ml of de-ionized water and 10 drops of 1:1 hydrochloric acid. Several more drops of 1:1 aqueous HCl were added to lower the pH to 3.0. The final product contained 7.84% (theoretical) solids.

percent of glycidaldehyde is based on the moles of polyacrylamide.

Compositions, reactions, conditions and activities of glycidaldehyde-reacted acrylamide copolymer for wet and dry strength in paper. All polymers tested at 0.4% on unbleached western kraft pulp.

| | Composition | | | Reaction | | | | |
|---|---|---|---|---|---|---|---|---|
| Product | Backbone type | mole % Mannich[b] | mole % glycidaldehyde | pH[c] | time (min)[d] | moleconc.[e] glycidaldehyde | D.T.[f] sample/blank | W.T.[g] sample/blank |
| 48A | Mannich | 25 | 35 | 6.9 | 30 | 0.44 | 19.1/15.5 | 0.9/0 |
| 48B | " | 25 | 35 | 8.0 | 15 | 0.40 | 20.7/15.5 | 1.7/0 |
| 55A | " | 25 | 50 | 8.0 | 22 | 0.62 | 30.1/17.9 | 1.0/0 |
| 55B | " | 50 | 50 | 8.0 | 15 | 0.57 | 27.3/17.9 | 0.6/0 |
| 55C | " | 50 | 75 | 8.0 | 10.5 | 0.84 | 28.3/17.9 | 1.2/0 |
| 78A | " | 25 | 50 | 9.0 | 10.8 | 0.62 | 28.2/19.3 | 2.9/0.5 |
| 78C | " | 25 | 50 | 10.0 | 12.2 | 0.61 | 29.0/19.3 | 4.5/0.5 |
| 79A | " | 25 | 50 | 7.0 | 45.5 | 0.62 | 30.4/19.3 | 2.1/0.5 |
| 104A | 80 AcAm:20DMAEM[a] | — | 23 | 9.0 | 25 | 0.25 | 26.3/22.1 | 1.3/0 |

[a] 80 mole % acrylamide and 20 mole % dimethylaminolthyl methacrylate (DMAEM) copolymer.
[b] mole % dimethylamine and formaldehyde added to polyacrylamide - based on polyacrylamide.
[c] pH just after addition of glycidaldehyde.
[d] time from addition of glycidaldehyde to quenching.
[e] moles of glycidaldehyde per 1000 g of reaction mixture.
[f] D.T. = dry tensile strength in lb./in., first figure is D.T. of treated paper/second is D.T. of untreated paper.
[g] W.T. = wet tensile strength in lb./in., first figure is W.T. of treated paper/second is W.T. of untreated paper.

EXAMPLE 3

Another Preparation of an Initial Polymer

A similar procedure is used for copolymers of acrylamide and dimethylaminoethyl methacrylate (DMAEM). These two monomers were copolymerized in an acidic solution of water and isopropanol and diluted to 10% solids to give a cationic polymer similar to the Mannic polymers prepared in Example 1. The pH was adjusted to the alkaline range and glycidaldehyde was added similar to Example 2.

EXAMPLE 4

Testing of Wet and Dry Paper Strengths

Unbleached western kraft pulp (35 sec. Williams freeness) was diluted to about 0.4% consistency with tap water. The pH of the slurry was adjusted to pH 5.0 with aqueous sulfuric acid. The pulp slurry was treated with 0.4% polymer (theoretical solids basis) based on oven-dry fiber and mixed for two minutes. Handsheets were made on a Noble & Wood mold diluting the treated slurry with pH-adjusted tap water. The sheets were pressed and drum dried before aging overnight at 72° F. and 50° R.H. Tensile measurements were made in the usual fashion. Raw strength data were corrected for basis weight differences.

Table 1 lists several of the results of the tensile tests of glycidaldehyde modified polymers similar to those prepared in Examples 1 through 4. The tensile strengths were run with a Thwing Albert tester. Note the mole percent of glycidaldehyde is based on the moles of polyacrylamide.

Manufacture of glycidaldehyde is done as follows: Acrolein monomer is oxidized by hydrogen peroxide or hypochloride under aqueous alkaline conditions to high yields, about 80–90% of glycidaldehyde. It boils at 112° to 113° C. and can be distilled from water.

Thus it is apparent that there has been provided, in accordance with the invention, a product and a method that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim:

1. A method of treating paper to increase wet and dry tensile strengths, comprising; adding to a paper slurry a reaction product of (1) glycidaldehyde and (2) a polyacrylamide containing both (a) tertiary amine cationic reactive sites and (b) amide reactive sites; said reaction product containing unreacted aldehyde reactive to cellulose; the added reaction product being in an amount effective to impart enhanced strength to the paper; and subsequently subjecting the slurry to sheet formation.

2. Paper including a polymer which is the reaction product of glycidaldehyde and polyacrylamide, the polyacrylamide containing both tertiary amine-cationic reactive sites and amide reactive sites, reacted with glycidaldehyde so as to leave unreacted aldehyde in the polymer whereby the polymer is reactive to cellulose, in an amount to impart enhanced strength to the paper.

* * * * *